(12) United States Patent
Gilfillan

(10) Patent No.: US 11,945,694 B1
(45) Date of Patent: Apr. 2, 2024

(54) MASTER LINK TEST FIXTURE ASSEMBLY

(71) Applicant: The Crosby Group LLC, Tulsa, OK (US)

(72) Inventor: Greg Gilfillan, Claremore, OK (US)

(73) Assignee: The Crosby Group LLC, Tulsa, OK (US)

(*) Notice: Subject to any disclaimer, the term of this patent is extended or adjusted under 35 U.S.C. 154(b) by 400 days.

(21) Appl. No.: 17/373,882

(22) Filed: Jul. 13, 2021

Related U.S. Application Data

(60) Provisional application No. 63/055,614, filed on Jul. 23, 2020.

(51) Int. Cl.
*B66C 1/12* (2006.01)
*F16G 15/00* (2006.01)

(52) U.S. Cl.
CPC .............. *B66C 1/125* (2013.01); *F16G 15/00* (2013.01)

(58) Field of Classification Search
CPC .. B66C 1/125; B66C 1/14; B66C 1/40; F16G 15/00; F16G 15/04; F16G 15/06
See application file for complete search history.

(56) References Cited

U.S. PATENT DOCUMENTS

| 1,567,719 | A | * | 12/1925 | Erlandsen | B66C 1/00 294/82.11 |
|---|---|---|---|---|---|
| 7,825,770 | B2 | * | 11/2010 | Postelwait | B66C 1/12 340/572.1 |
| 8,905,448 | B2 | * | 12/2014 | Vaz Coelho | B66C 1/66 294/82.11 |
| 9,726,255 | B1 | * | 8/2017 | Tarrant | B66C 1/10 |
| 2004/0207221 | A1 | * | 10/2004 | Hockenhull | B66C 1/00 294/82.1 |
| 2020/0039797 | A9 | * | 2/2020 | Pickersgill | B66C 1/34 |

FOREIGN PATENT DOCUMENTS

| EP | 1232991 A2 | * | 8/2002 | ............. B66C 1/125 |
|---|---|---|---|---|
| KR | 200467345 Y1 | * | 6/2013 | ............... B66C 1/66 |

* cited by examiner

*Primary Examiner* — Adam J Eiseman
*Assistant Examiner* — Jared O Brown
(74) *Attorney, Agent, or Firm* — Head, Johnson, Kachigian & Wilkinson, PC

(57) ABSTRACT

A test fixture assembly for proof testing of a master link and a sling assembly. In one embodiment, the test fixture assembly includes a lift connector with a pair of opposed eyes and a pin receivable through the pair of eyes. An optional guide sleeve is receivable over the pin between the opposed eyes. A pair of opposed plates are suspended from the pin. At least a first pair of spaced apart load posts extend between the pair of opposed plates and are configured to receive a master link. For testing a sling assembly with multiple sling legs, a pivoting equalizer plate and a pair of spaced apart equalizer connectors are configured to pivotally connect to the multiple sling legs.

15 Claims, 14 Drawing Sheets

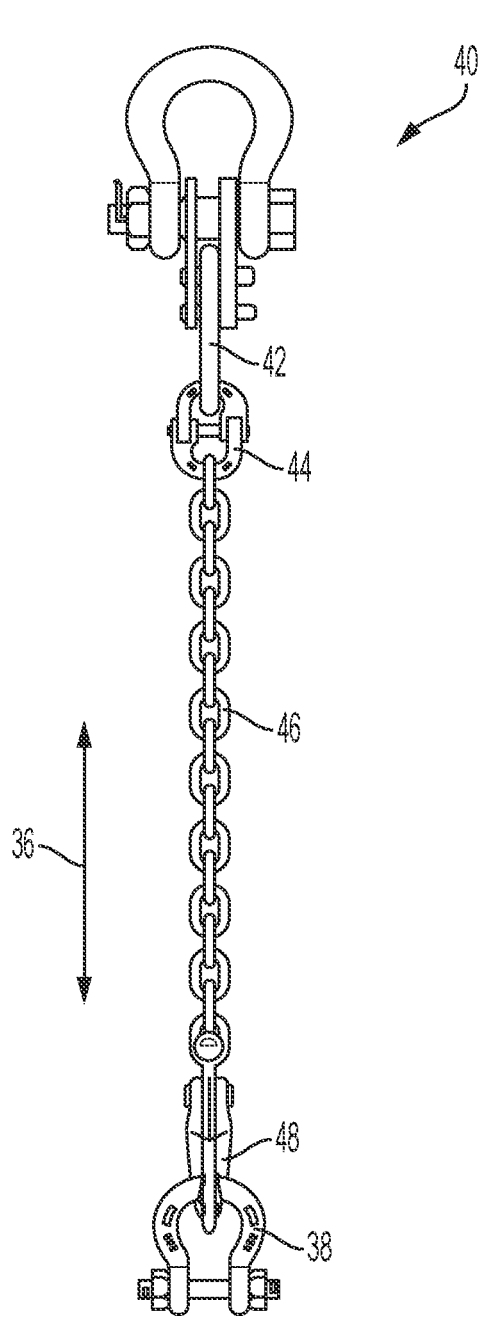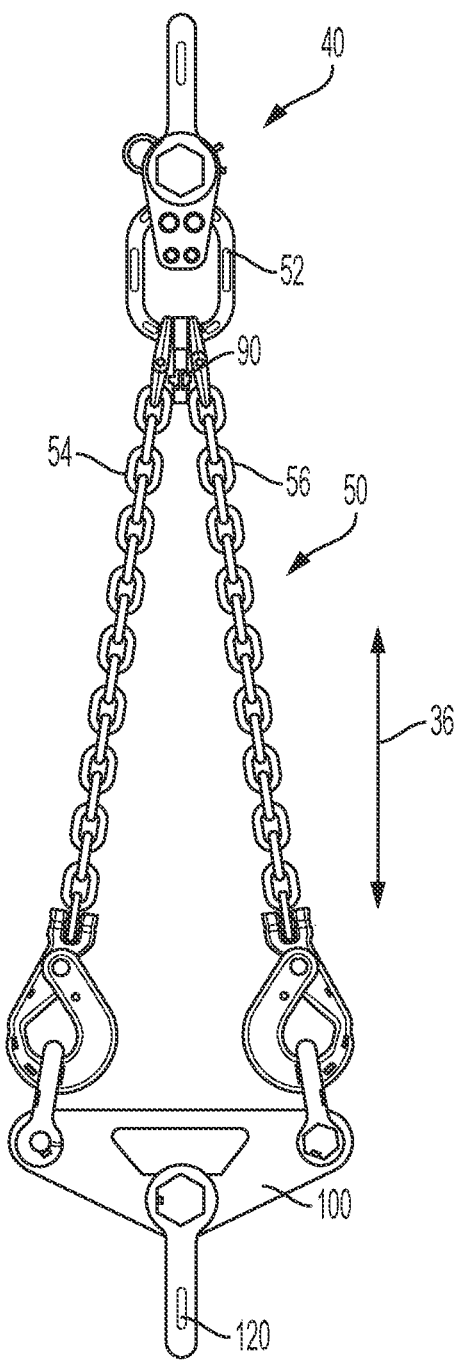
Fig. 3
Fig. 4

MASTER LINK TEST FIXTURE ASSEMBLY

CROSS-REFERENCE

This application is based on and claims priority to U.S. Provisional Patent Application Ser. No. 63/055,614, filed Jul. 23, 2020, which is incorporated herein in its entirety by reference.

BACKGROUND OF THE INVENTION

1. Field of the Invention

The present invention is directed to a test fixture assembly for proof testing of a master link or master link assembly and for proof testing of a sling assembly.

2. Description of the Related Art

Lifting slings are often utilized to attach to a heavy object to be lifted. Various lifting slings are utilized to safely attach to and grab loads to be lifted. A master link assembly is used to affix lifting slings to loads and to lifting equipment.

Metal master links which are used as an upper end component of a lifting sling are one component of multi-legged sling assemblies. Different materials may be used for the legs, such as chain, wire rope or synthetic woven material.

Components of a lifting sling are proof tested after manufacture in the factory in order to ensure quality and integrity of the products. Proof testing is a quality control tensile test to verify manufacturing and material quality.

Point loading during proof testing is not advisable since it is possible that the master link will deform due to point loading. For this reason, master links are typically proof tested in a factory with a fixture. A known static manufacturer's fixture is shown in FIG. 1. The proof test forces are spread out between varying widths, commonly up to 70 percent of the inside width of the master link. Accordingly, different size fixtures would be used for different master links.

Chain sling assemblies are required to be proof tested. An assembled chain sling is considered proof tested if it is either proof tested on a component level by the manufacturer or proof tested as an assembly by the sling manufacturer. In addition, wire rope slings require proof testing by the sling manufacturer. In addition to component manufacturer testing, sling manufacturers typically proof test the assembled sling either as a requirement, as a quality control practice, or by an end user or customer request.

In practice, the legs of the sling are tested individually. Individually testing the legs limits efficiency since only one leg is tested at a time as a result of tolerance of the chain or wire rope making multiple legs slightly different lengths, risking overloading a sling leg if multiple legs were tested at the same time.

In order to avoid point loading, sling assembly manufacturers sometimes resort to "homemade" solutions such as padding or synthetic rope to distribute the load on the master link during the proof testing. A known example of current proof testing of a sling assembly may be seen in FIG. 2.

Accordingly, it would be desirable to provide a master link test fixture assembly to prevent localized point loading and deformation during proof testing of master links.

It would further be desirable to provide a master link test fixture assembly wherein a single test fixture assembly is adaptable to multiple sizes of master links.

It would be further desirable to provide a master link test fixture assembly to prevent localized point loading and deformation during proof testing of multi-leg sling assemblies.

It would further be desirable to provide a master link test fixture assembly wherein an entire sling assembly including multiple legs could be proof tested at the same time.

It would further be desirable to provide a master link test fixture assembly to proof test multiple types of sling assemblies.

SUMMARY OF THE INVENTION

The present invention is directed to a test fixture assembly for proof testing of a master link or master link assembly and for proof testing of a sling assembly.

In one preferred embodiment, the test fixture assembly includes a lift connector with a pair of opposed eyes and a pin receivable through the pair of opposed eyes. An optional guide sleeve is receivable over the pin between the opposed eyes. A pair of opposed, parallel plates retain the guide sleeve and are suspended from the pin. At least a first pair of spaced apart load posts extends between the pair of opposed plates. The first pair of spaced apart load posts is configured to receive a master link thereon.

In order to proof test a sling assembly having multiple legs, an optional spacer having an open mouth and a normally closed latch closing the mouth may be installed between legs of the sling surrounding the master link.

The present invention may be used to proof test a single leg sling assembly or a multi-leg sling assembly. For testing a multi-leg sling assembly, a pivoting equalizer plate assembly is connected to the sling legs. A pair of spaced apart balancer connectors is configured to pivotally connect the sling legs to the equalizer plate and an opposed bottom balancer connector connects the equalizer plate for testing of an entire multi-leg sling assembly.

In a second preferred embodiment, a test fixture assembly for proof testing of a master link and proof testing of a sling assembly includes a lift connector with a pair of opposed ears having opposed eyes. The pin is receivable through the pair of opposed eyes. An indexable unit assembly is receivable over the pin between the pair of opposed ears wherein the indexable unit assembly is configured to receive a master link.

The indexable unit assembly includes a cap ring, a load ring, a lock ring, and extending prongs. The cap ring, the load ring, and the lock ring each have concentric inner openings receivable over the pin. The prongs extend from the lock ring and are receivable over the ears of the lift connector in order to prevent rotational movement of the indexable unit assembly.

The load ring has an outer diameter with a plurality of different diameters depending on the radial orientation of the load ring. In one non-limiting configuration, the outer diameter has four different diameters to accommodate different size master links.

BRIEF DESCRIPTION OF THE DRAWINGS

FIG. 3 illustrates a first preferred embodiment of a test fixture assembly constructed in accordance with the present invention connected to a master link of a single leg sling assembly to be proof tested;

FIG. 4 illustrates the test fixture assembly, a spacer, and a pivoting equalizer plate assembly of the present invention for testing of a two-leg sling assembly;

DETAILED DESCRIPTION OF THE INVENTION

The embodiments discussed herein are merely illustrative of specific manners in which to make and use the invention and are not to be interpreted as limiting the scope.

While the invention has been described with a certain degree of particularity, it is to be noted that many modifications may be made in the details of the invention's construction and the arrangement of its components without departing from the scope of this disclosure. It is understood that the invention is not limited to the embodiments set forth herein for purposes of exemplification.

Figure 1:
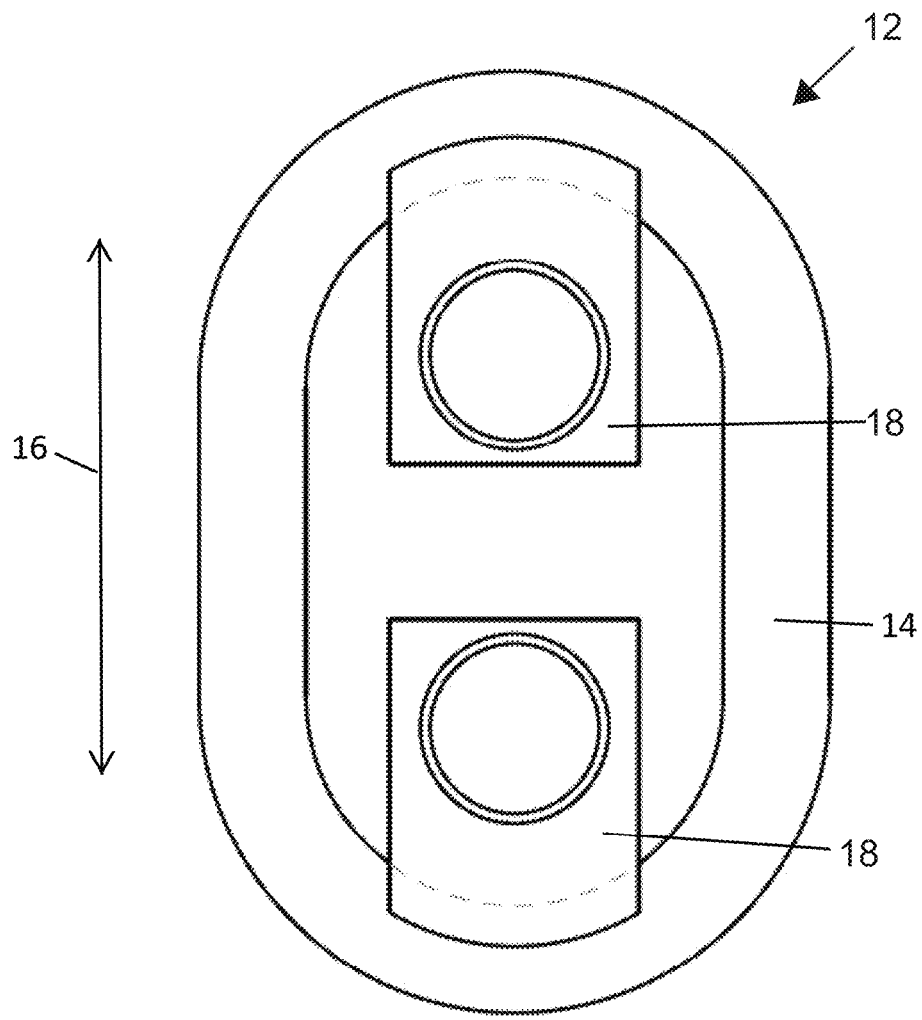
FIG. 1 illustrates an existing, prior art factory test fixture for proof testing of a master link.

FIG. 1 illustrates an example of an existing, prior art factory test fixture 12 for proof testing of a master link 14. The test fixture 12 includes a pair of opposed saddles 18 and supplies force as illustrated by arrows 16 in order to proof test the master link 14. Rather than apply force at any single point, the test fixture 12 provides force distribution up to 70 percent of the inside width of the master link 14.

Figure 2:
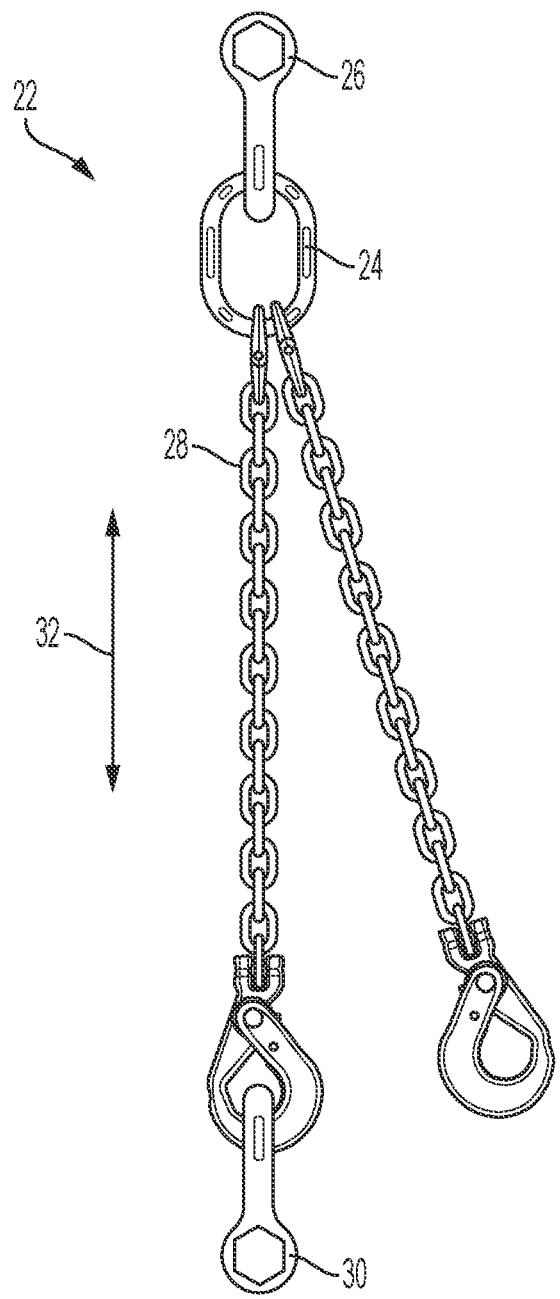
FIG. 2 illustrates an example of an existing, prior art arrangement for proof testing of a single leg of a multi-leg sling assembly.

FIG. 2 illustrates an example of an existing, prior art arrangement 22 for testing of a multi-leg sling assembly. A master link 24 is attached to a set of test system connectors 26 and 30 along with a single leg 28. The leg 28 is also connected to the test connector 30. Opposing force is applied to the test connectors 26 and 30 as shown by arrows 32. Each leg, such as leg 28, is tested separately and independently of the other legs.

FIGS. 3 and 4 illustrate two separate applications of use of a test fixture assembly 40 for proof testing constructed in accordance with present invention. FIG. 3 illustrates use of the test fixture assembly 40 with a single leg sling assembly while FIG. 4 illustrates use of the test fixture assembly with a multi-leg sling assembly.

As seen in FIG. 3, the test fixture assembly 40 is connected to a master link 42 to be proof tested which, in turn, is connected to a connecting link 44 which is attached and connected to a chain 46, a connecting link 48, and thereafter to a shackle connector 38. Opposing force is applied as shown by arrows 36.

FIG. 4 illustrates an embodiment of the test fixture assembly 40 in use with a two-leg sling assembly 50 to be tested having a master link 52, a pair of chain legs 54 and 56, a spacer 90 to be described in detail, and a pivoting equalizer plate assembly 100 to be described in detail.

Figure 5:
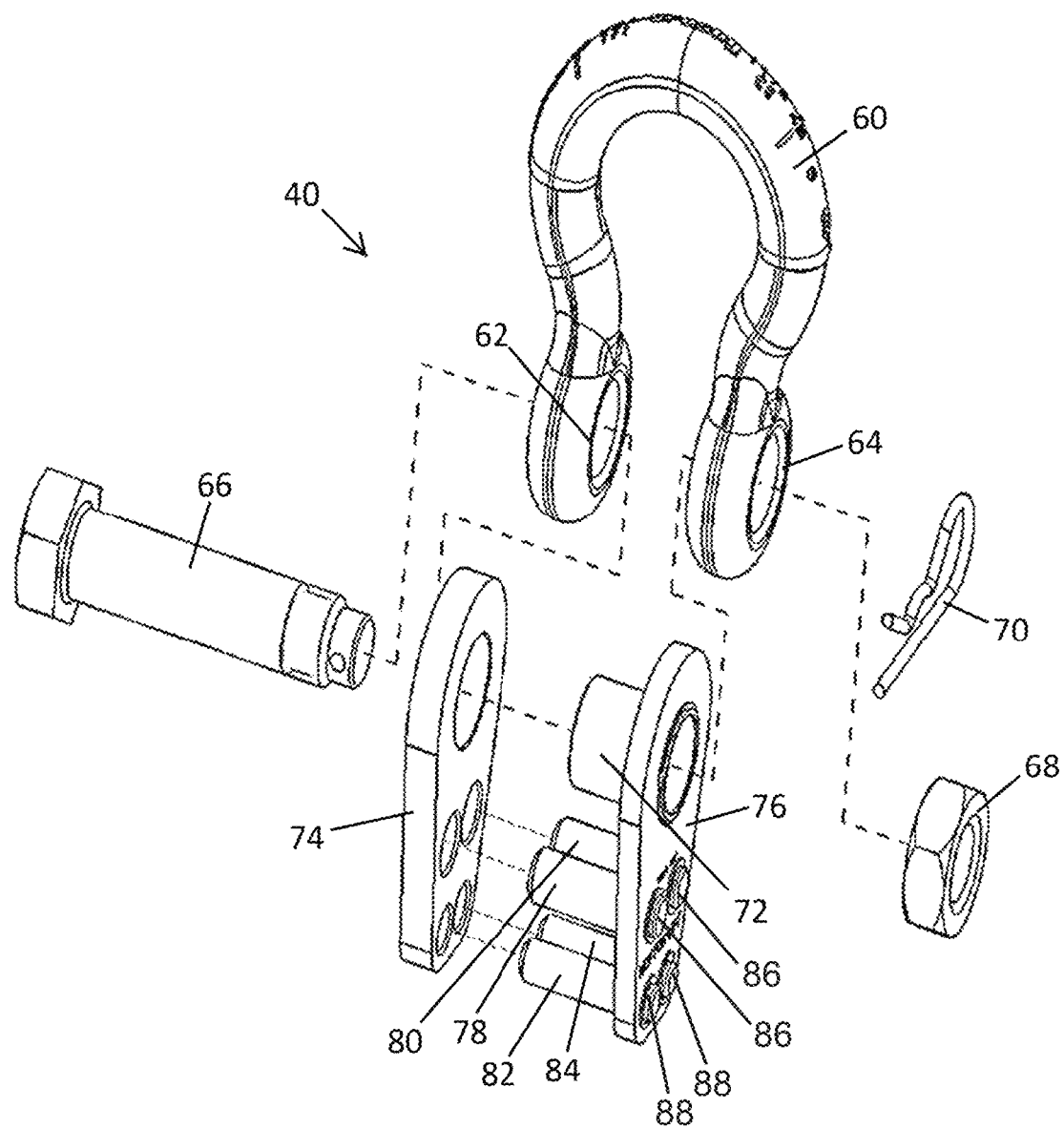
FIG. 5 illustrates an exploded view of the test fixture assembly.

FIG. 5 illustrates an exploded view of the test fixture assembly 40. The test fixture assembly 40 includes a lift connector 60 having a pair of opposed eyes 62 and 64. In the present embodiment, the lift connector 60 is a shackle, however, it will be appreciated that the lift connector might alternately be a hook or other lifting device within the spirit of the invention.

A pin 66 is received through the pair of opposed eyes 62 and 64. The pin includes a head at one end and threads at an opposed end for receipt of a nut 68 and cotter pin 70. While a threaded pin and nut arrangement is employed in the present embodiment, it will be understood that other pin retention or other fastener arrangements might be utilized within the spirit and scope of the invention.

An optional guide sleeve 72 is received over the pin 66 between the opposed eyes 62 and 64. The guide sleeve 72 has an inner diameter slightly larger than the outer diameter of the pin 66 and has an outer diameter slightly smaller than the corresponding through holes through each of parallel plates 74 and 76.

A pair of opposed, parallel plates 74 and 76 assist in retaining the guide sleeve 72 between the eyes 62 and 64 of the lift connector 44. The pair of opposed plates 74 and 76 are suspended from the pin 66. In the embodiment shown, the guide sleeve 72 is attached to and extends from the plate 76. The guide sleeve 72 also fits within an opening of the opposed plate 74. By removing the pin 66, the guide sleeve 72 and opposed plates 74 and 76 may be removed from the test fixture assembly 40.

A load support structure, such as a saddle or a first pair of parallel spaced apart load posts 78 and 80, extends between the pair of opposed plates 74 and 76. In one configuration, the first pair of spaced apart load posts 78 and 80 is removably retained in the opposed plates 74 and 76 by clips 86. Accordingly, the load posts 78 and 80 may be removed and replaced. The load posts are spaced apart such that their points of contact with the master link do not exceed 60 percent of the inside width of a master link to be tested.

An optional load support structure, such as a saddle or second pair of parallel spaced apart load posts 82 and 84, is removably retained in the pair of opposed plates 74 and 76. The second pair of spaced apart load posts may be removably retained by clips 88. The second pair of spaced apart load posts 82 and 84 is spaced apart such that their points of contact with the master link do not exceed 60 percent of the width of the master link to be tested. Utilizing two pairs of spaced apart load posts will allow testing of different sizes of master links.

In the present embodiment, the load posts are spaced using a 60 percent master link width limit, however, it will be appreciated that the spacing of the support structures can alternatively be based on contact limits commonly ranging from 40 to 70 percent of the master link width.

In order to test a multi-leg sling assembly as shown in FIG. 4, an optional spacer 90 surrounds the master link 52. A spacer 90 will be utilized when testing sling assemblies with multiple legs and the spacing between the legs is not sufficient to avoid point loading.

Figure 6:
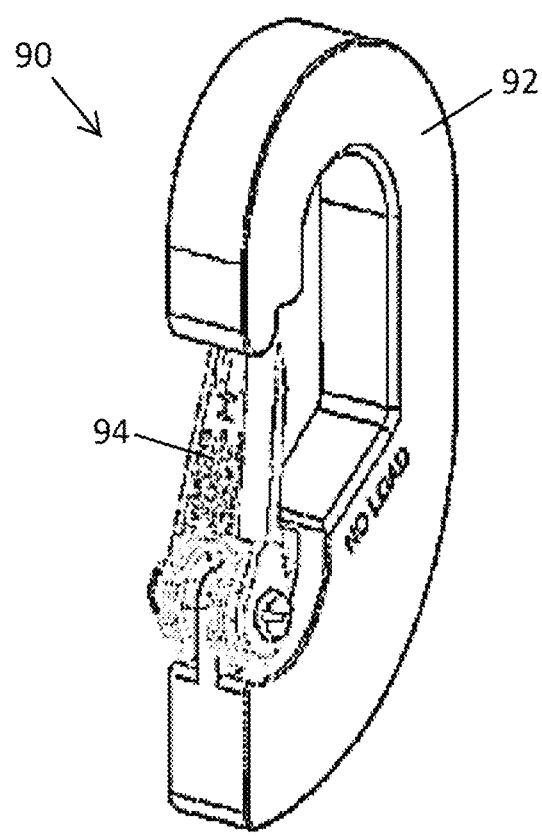
FIG. 6 illustrates a perspective view of the spacer shown in FIG. 4 apart from the test fixture assembly.

FIG. 6 illustrates a perspective view of the spacer 90 apart from the present invention. The spacer 90 includes a clip 92 with an open mouth and a spring loaded, normally closed latch 94 closing a mouth. The spacer 90 is not for load purposes and serves to space the legs from each other on the master link 52.

In order to test a multi-leg sling assembly 50 as shown in FIG. 4, a pivoting equalizer plate assembly 100 is utilized.

Figure 7:
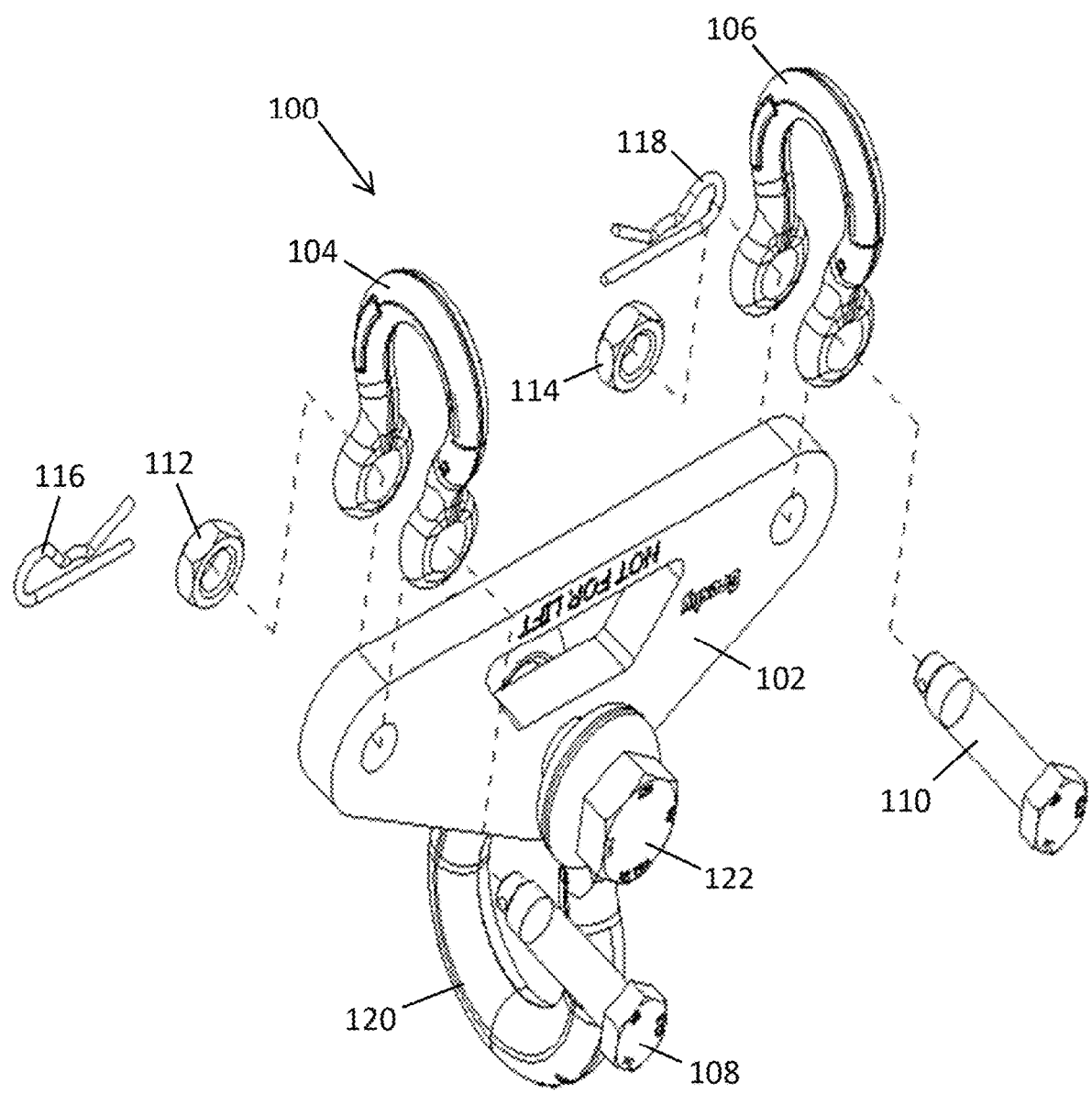
FIG. 7 illustrates an exploded view of the pivoting equalizer plate assembly of the present invention.

The pivoting equalizer plate assembly 100 is shown in the exploded view in FIG. 7. The equalizer plate assembly 100 includes a triangular equalizer plate 102 which is configured to pivotally connect to the pair of sling legs (such as sling legs 54 and 56 in FIG. 4).

In the embodiment shown, a pair of spaced apart equalizer balancer connectors 104 and 106 is configured to pivotally connect to the triangular plate 102. The balancer connectors 104 and 106 include balancer bolts or pins 108 and 110, nuts 112 and 114, and cotter pins 116 and 118, respectively. While shackles are used in the present embodiment, other equalizer balancer connectors are, of course, possible within the spirit and scope of the invention.

The pivoting equalizer assembly 100 also includes a bottom balancer connector 120 in the form of a shackle and a bolt or a pin 122.

Use of the equalizer plate assembly 100 will permit testing of a multi-leg sling assembly while accommodating differences in the length of the individual sling legs.

Figure 8:
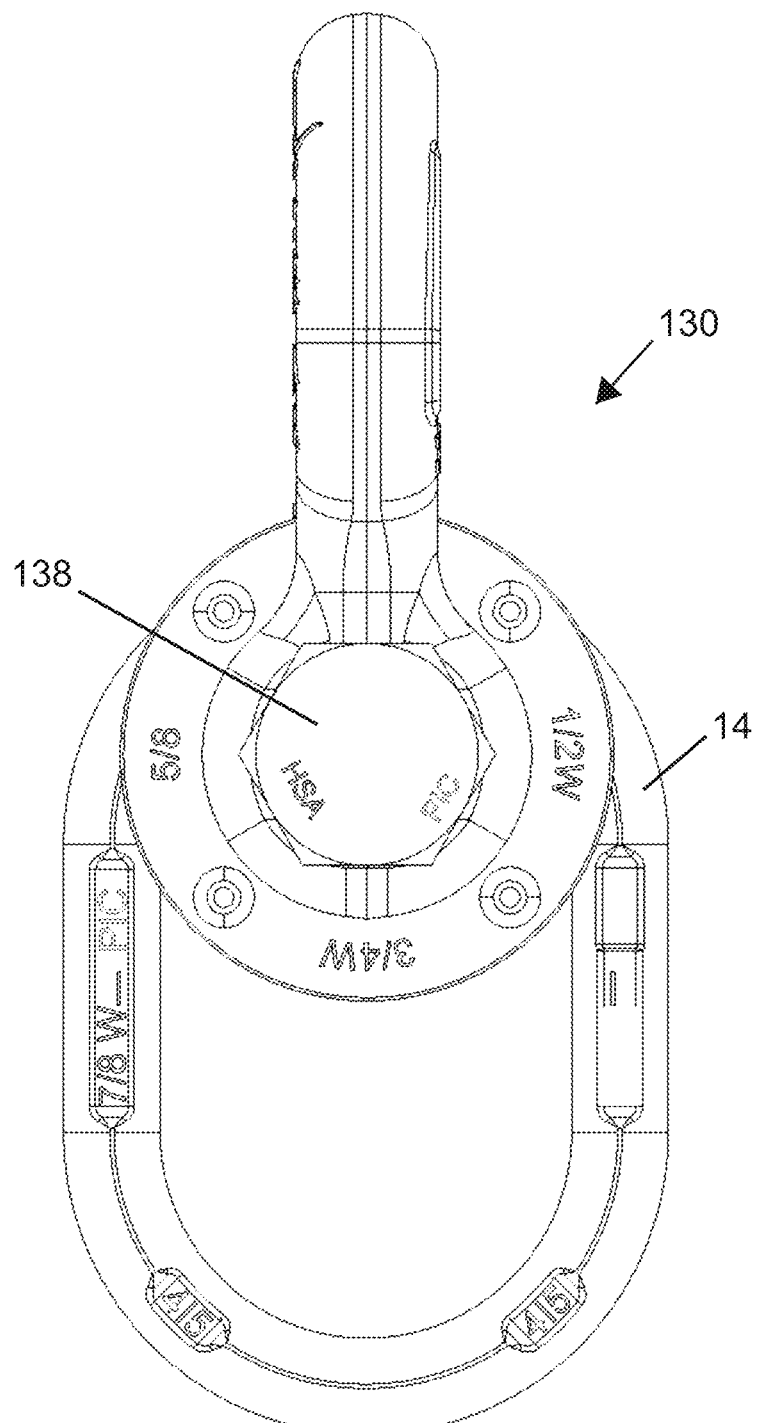
FIG. 8 illustrates a side view and FIG. 9 illustrates a front view of a test fixture assembly for proof testing.
Figure 9:
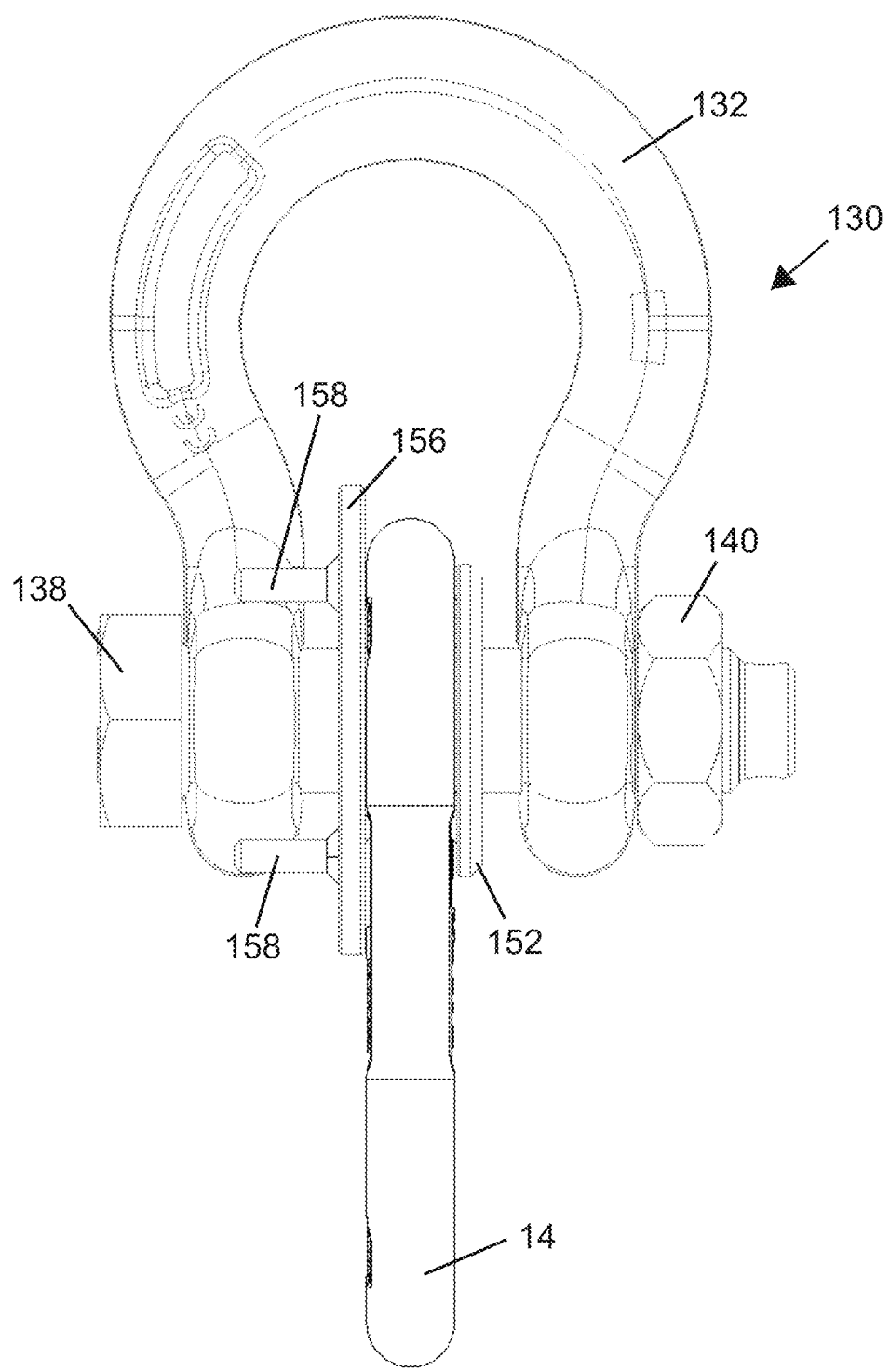
Figure 10:
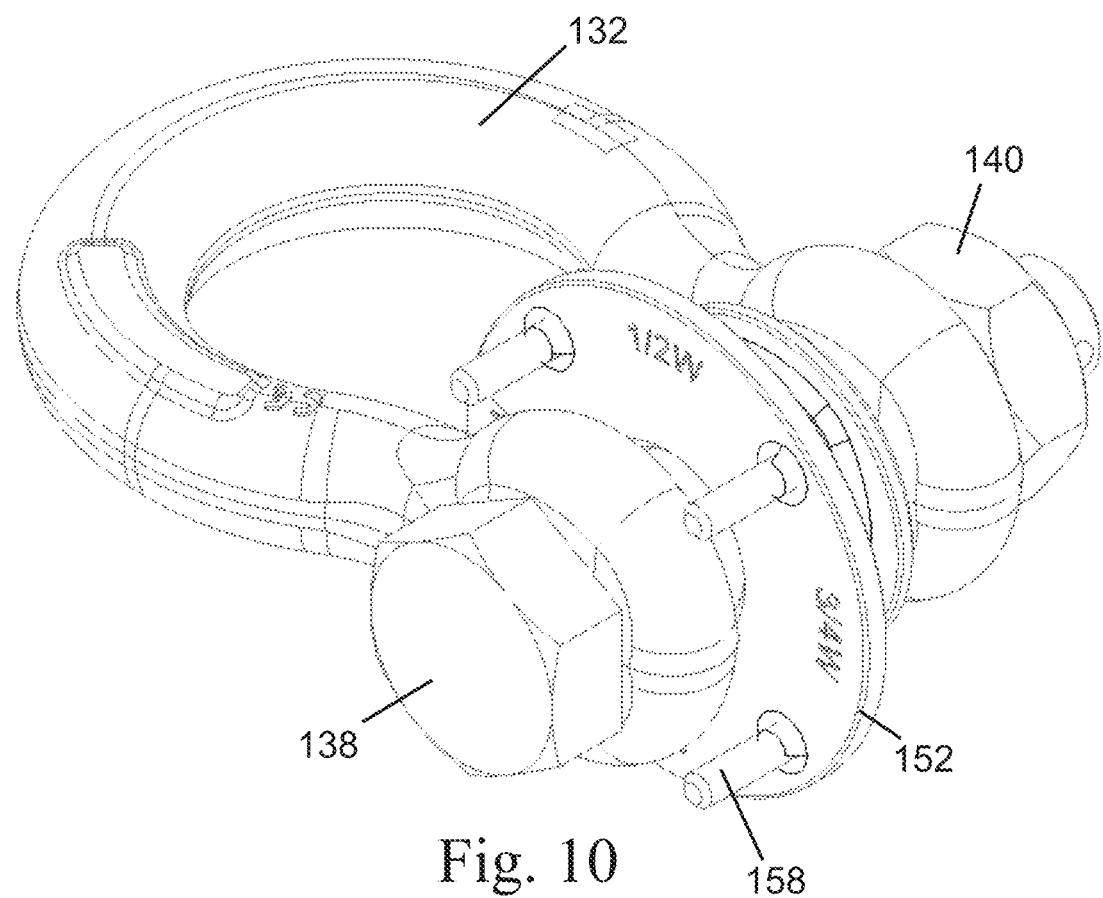
FIGS. 10 and 11 illustrate alternate perspective views of the test fixture assembly show in FIGS. 8 and 9.
Figure 11:
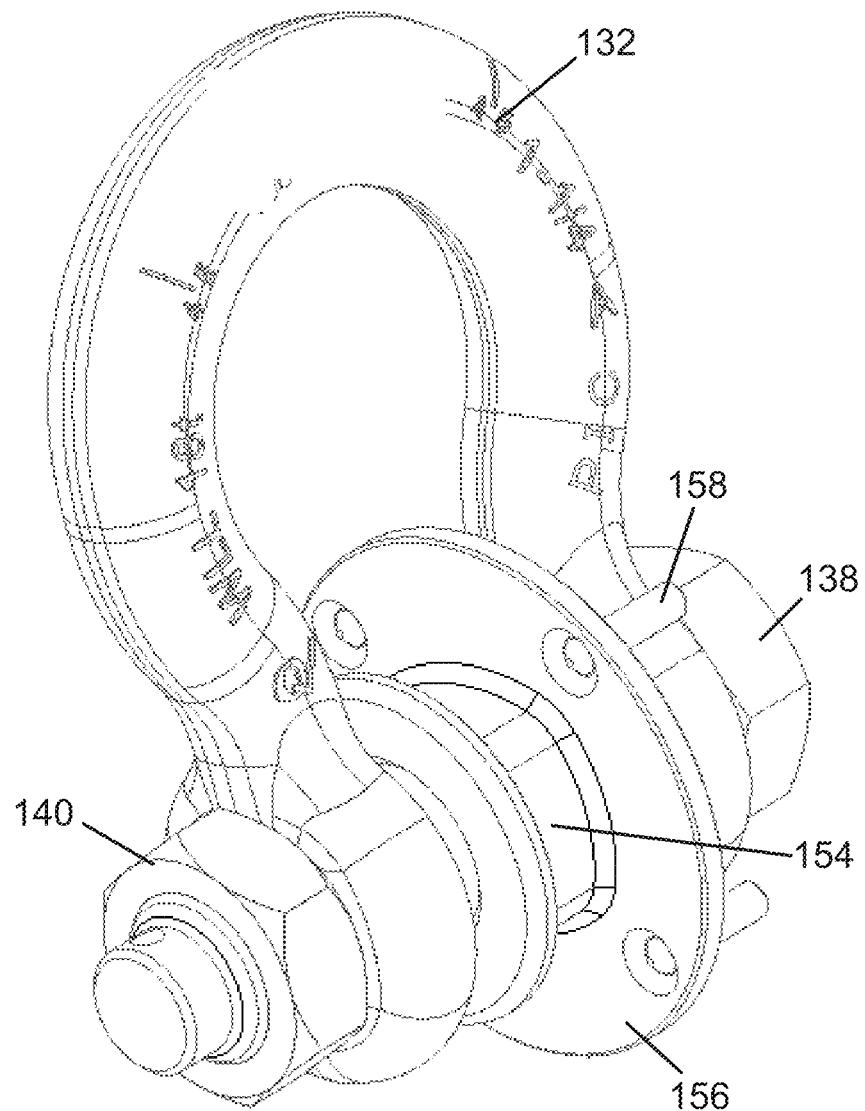
Figure 12:
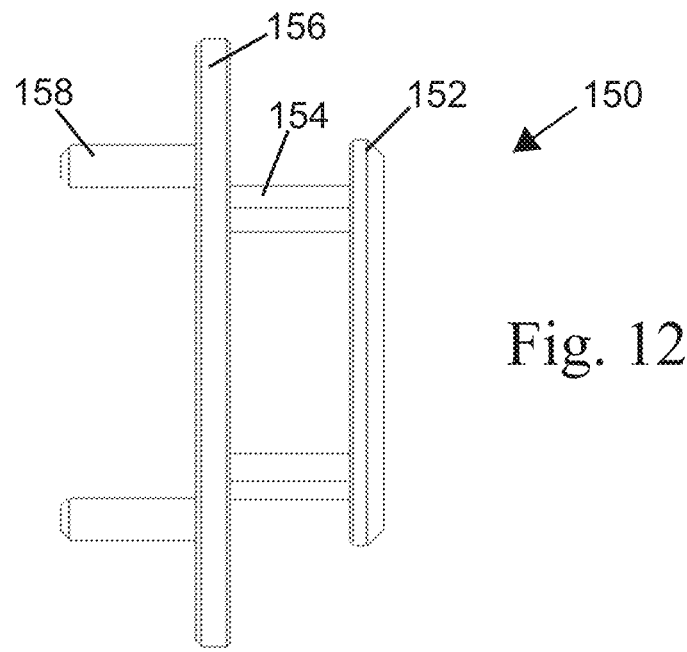
FIGS. 12, 13, and 14 illustrate alternate perspective views of an indexable unit assembly apart from the test fixture assembly.
Figure 13:
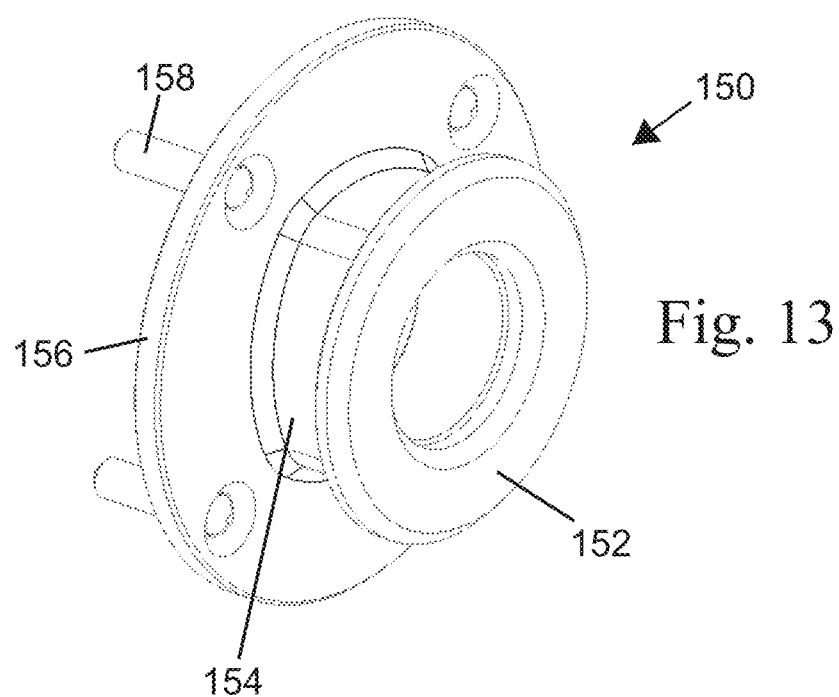
Figure 14:
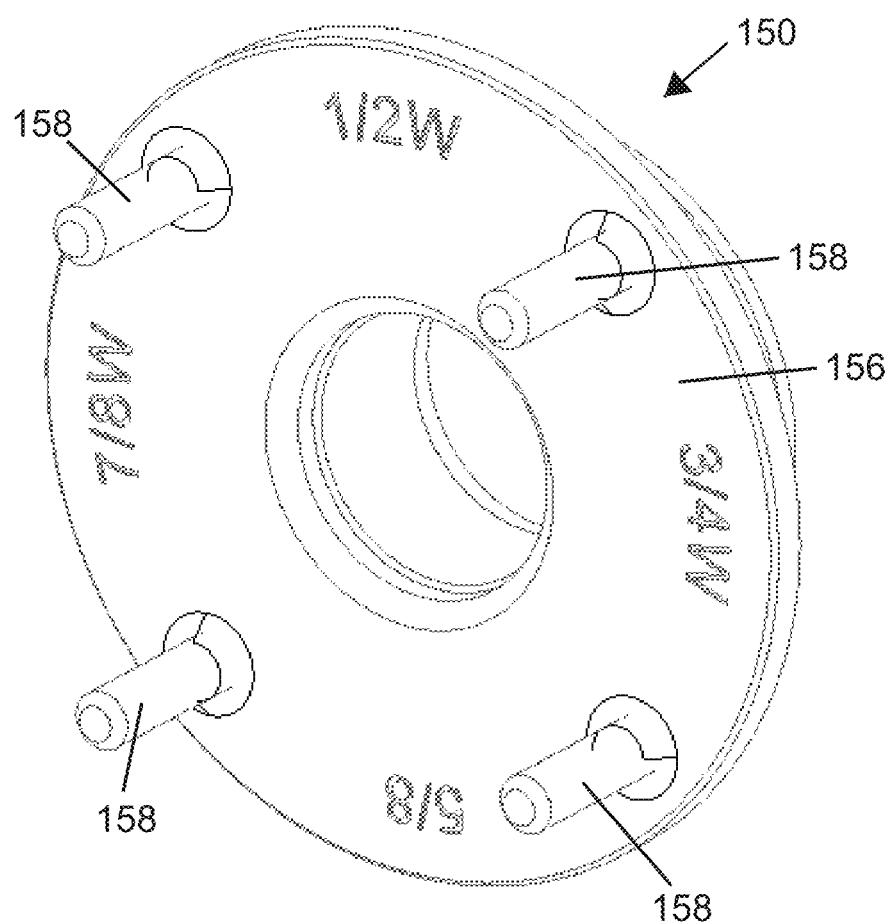

FIGS. 8 through 16 illustrate a further preferred embodiment of the test fixture assembly 130 for proof testing. FIG. 8 illustrates a side view of the test fixture assembly 130 with a master link 14 thereon while FIG. 9 illustrates a front view of the test fixture assembly 130. FIGS. 10 and 11 illustrate alternate perspective views of the test fixture assembly 130 apart from the master link to be tested.

The master link 14 would, in turn, be connected to a connecting link attached and connected to a chain, a further connecting link, and thereafter to a shackle connector (not shown).

The text fixture assembly 130 includes a lift connector 132 and a pair of ears extending from legs with opposed eyes 134 and 136 in the ears.

The pin 138 includes a head at one end and threads at an opposed end for receipt of a threaded nut 140 and an optional cotter pin (not shown).

An indexable unit assembly 150 is received over the pin 138 between the opposed eyes of the lift connector 132. The indexable unit assembly 150 is shown apart from the test fixture assembly in FIGS. 12, 13, and 14. The indexable unit assembly 150 includes a cap ring 152, a load ring 154, a lock ring 156, and extending prongs 158.

Master links to be tested will rest on the load ring 154 between the lock ring and cap ring.

The cap ring 152, load ring 154, and lock ring 156 have concentric inner openings so that the indexable unit assembly 150 is receivable over the pin 138. The extending prongs 158 extend outward from the lock ring parallel to each other and parallel to the pin 138. The extending prongs 158 extend outward over the ears so that the indexable unit assembly is prevented from rotating.

Figure 15:
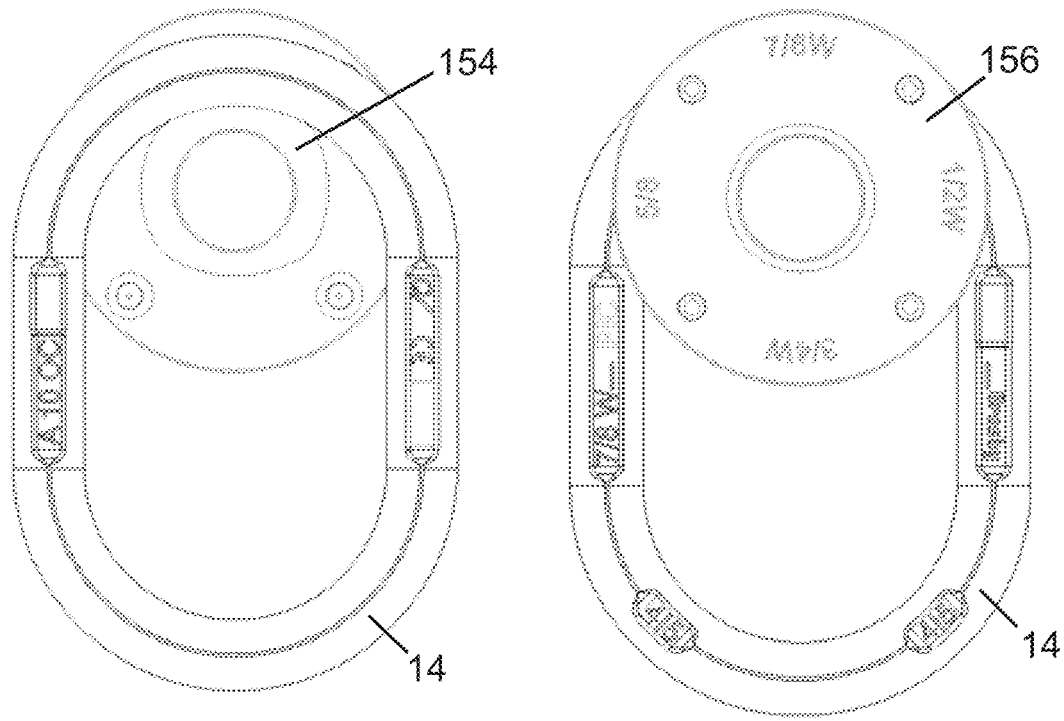
FIGS. 15 and 16 illustrate the indexable unit assembly of the test fixture assembly in different radial orientations for testing of different size master links.
Figure 15:
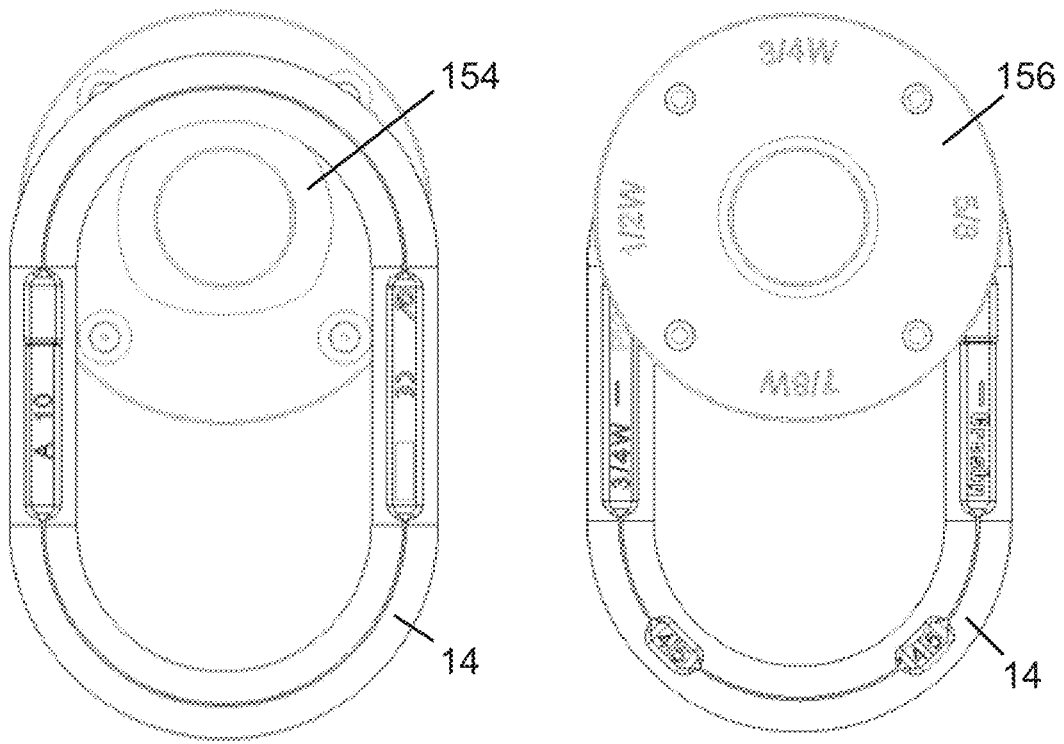
Figure 16:
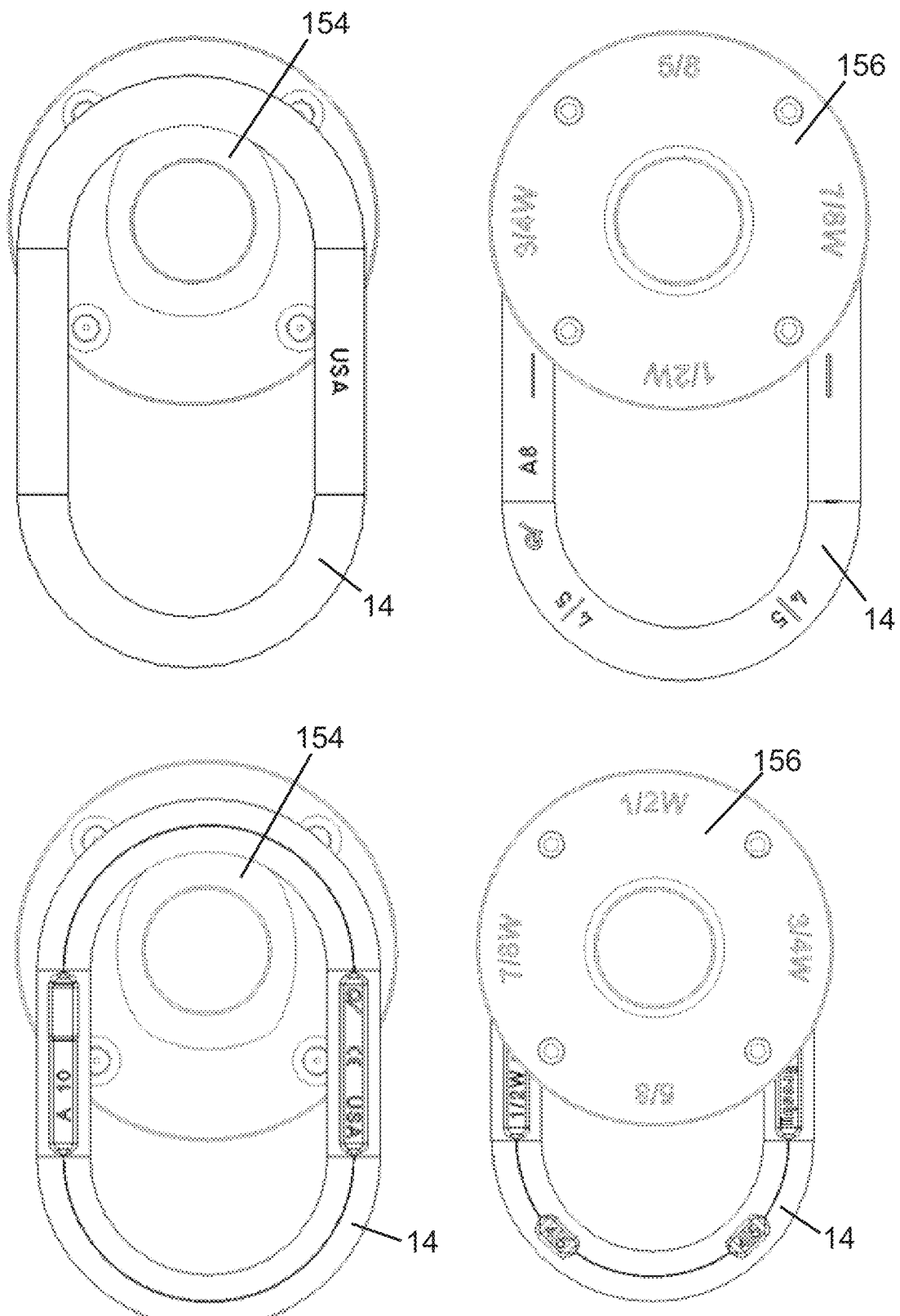

The proof test fixture is indexable to allow proper support and proof testing of various size master links during proof testing operations. As best seen in FIGS. 15 and 16, the load ring 154 has an outer periphery with a plurality of different diameters to accommodate different master link sizes. In the present embodiment, the load ring 154 has four different diameters.

The prongs 158 extending from the lock ring 156 of the indexable unit assembly 150 prevent undesired rotation of the indexable unit assembly during test set up and ensure the selected lock ring diameter remains in proper orientation with the master link.

The load ring varies in diameter depending on the radial orientation of the assembly 150 to match the link 14.

Whereas, the invention has been described in relation to the drawings attached hereto, it should be understood that other and further modifications, apart from those shown or suggested herein, may be made within the scope of this invention.

What is claimed is:

1. A test fixture assembly for proof testing of a master link and for proof testing of a sling assembly, which test fixture assembly comprises:
    a lift connector with a pair of opposed eyes;
    a pin receivable through said pair of opposed eyes;
    a pair of opposed plates suspended from said pin; and
    a load support structure extending between said pair of opposed plates and configured to receive a master link;
    wherein said load support structure is at least a first pair of spaced apart load posts;
    and
    wherein a guide sleeve is receivable over said pin between said pair of opposed plates and said guide sleeve is attached to at least one of said pair of opposed plates by a clip.

2. The test fixture assembly as set forth in claim 1 wherein said lift connector is a shackle, wherein said pin has a threaded end receivable in one of said pair of eyes having threading, and including a cotter pin through an end of said pin.

3. The test fixture assembly as set forth in claim 1 wherein said first pair of spaced apart load posts are spaced apart such that contact between said first pair of spaced apart load posts and said master link does not exceed 60 percent of an inside width of said master link.

4. The test fixture assembly as set forth in claim 1 wherein said first pair of spaced apart load posts are removably retained in said pair of opposed plates by clips.

5. The test fixture assembly as set forth in claim 1 including a second pair of spaced apart load posts removably retained in said pair of opposed plates by clips.

6. The test fixture assembly as set forth in claim 1 wherein at least two sling legs are connected to said master link.

7. The test fixture assembly as set forth in claim 6 including a spacer that surrounds said master link between said at least two sling legs and spaces said sling legs apart.

8. The test fixture assembly as set forth in claim 7 wherein said spacer has an open mouth and a latch closing said mouth.

9. The test fixture assembly as set forth in claim 6 including a pivoting equalizer plate assembly, a pair of spaced apart equalizer balancer connectors configured to pivotally connect to said pair of sling legs, and a bottom balancer connector.

10. The test fixture assembly as set forth in claim 9 wherein said pivoting equalizer plate assembly includes a triangular equalizer plate, and wherein said equalizer balancer connectors and said bottom balancer connector are shackles.

11. A test fixture assembly for proof testing of a master link and for proof testing of a sling assembly, which test fixture assembly comprises:
    a lift connector with a pair of opposed ears having opposed eyes;
    a pin receivable through said pair of opposed eyes;
    an indexable unit assembly receivable over said pin between said pair of opposed eyes wherein said indexable unit assembly is configured to receive a master link, wherein said indexable unit assembly includes a cap ring, a load ring, a lock ring, and extending prongs.

12. The test fixture assembly as set forth in claim 11 wherein said cap ring, said load ring, and said lock ring each have concentric inner openings receivable over said pin.

13. The test fixture assembly as set forth in claim 12 wherein said extending prongs are receivable over said ears of lift connector.

14. The test fixture assembly of claim 11 wherein said load ring has an outer periphery having a plurality of different diameters depending on the radial orientation of the load ring.

15. A test fixture assembly for proof testing of a master link and for proof testing of a sling assembly, which test fixture assembly comprises:
- a lift connector with a pair of opposed eyes;
- a pin receivable through said pair of opposed eyes;
- a pair of opposed plates suspended from said pin; and
- a load support structure extending between said pair of opposed plates configured to receive a master link, wherein said load support structure is at least a first pair of spaced apart load posts and wherein said first pair of spaced apart load posts are removably retained in said pair of opposed plates by clips.

\* \* \* \* \*